(12) United States Patent
Bohush et al.

(10) Patent No.: US 7,809,142 B2
(45) Date of Patent: Oct. 5, 2010

(54) DATA SCRAMBLING AND ENCRYPTION OF DATABASE TABLES

(75) Inventors: John David Bohush, Rochester, MN (US); Christine Rose Rand, Rochester, MN (US); Michael Allen Rothschild, Rochester, MN (US); Michael Alan Venz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 11/765,105

(22) Filed: Jun. 19, 2007

(65) Prior Publication Data

US 2008/0317242 A1 Dec. 25, 2008

(51) Int. Cl.
*H04L 9/00* (2006.01)
*G06F 21/00* (2006.01)
*G06F 11/30* (2006.01)
*G06F 12/14* (2006.01)

(52) U.S. Cl. .................. 380/277; 713/186; 713/193

(58) Field of Classification Search .............. 380/277; 713/193, 186
See application file for complete search history.

(56) References Cited

U.S. PATENT DOCUMENTS

| | | | |
|---|---|---|---|
| 2004/0255133 A1* | 12/2004 | Lei et al. ............... | 713/193 |
| 2006/0053112 A1* | 3/2006 | Chitkara et al. ......... | 707/9 |
| 2007/0177740 A1* | 8/2007 | Nakajima ............... | 380/277 |
| 2007/0294539 A1* | 12/2007 | Shulman et al. ......... | 713/186 |
| 2008/0059414 A1* | 3/2008 | Cristofor et al. ........ | 707/2 |
| 2008/0097954 A1* | 4/2008 | Dutta et al. ............ | 707/1 |
| 2008/0162521 A1* | 7/2008 | Browning .............. | 707/101 |

\* cited by examiner

*Primary Examiner*—Shin-Hon Chen
(74) *Attorney, Agent, or Firm*—Wood, Herron & Evans, LLP

(57) ABSTRACT

An apparatus, program product and method protect data in a database table from unauthorized access through the combination of scrambling the data in the rows and columns of a database table and encrypting the data in different rows and/or columns using different encryption keys. A complementary descrambling and decryption process may then be used by an authorized party to recover the data stored in the scrambled and encrypted table.

7 Claims, 2 Drawing Sheets

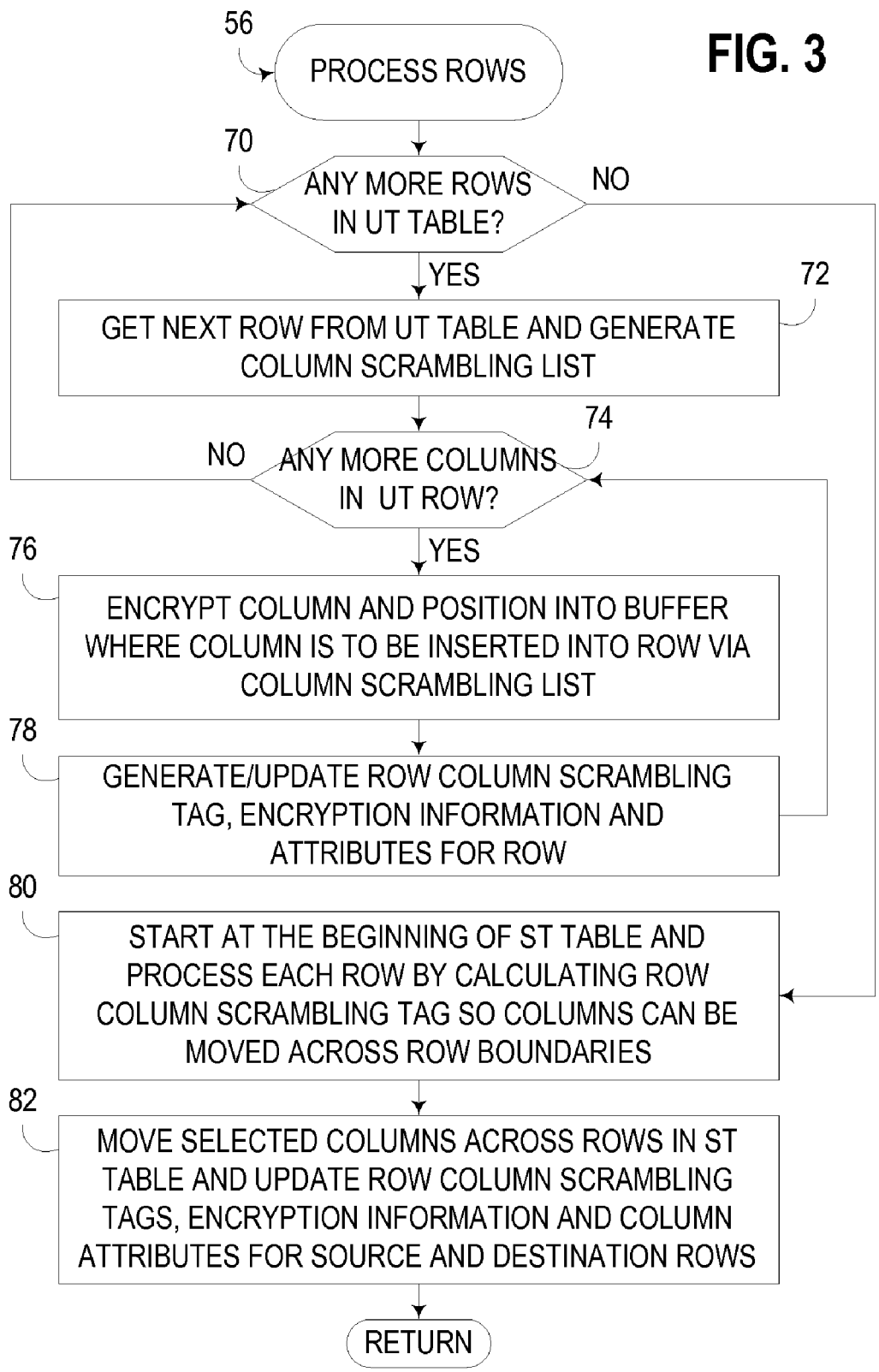

DATA SCRAMBLING AND ENCRYPTION OF DATABASE TABLES

FIELD OF THE INVENTION

The invention relates to database management systems, and in particular, to securing data stored within and/or output by database management systems.

BACKGROUND OF THE INVENTION

Databases are used to store information for an innumerable number of applications, including various commercial, industrial, technical, scientific and educational applications. As the reliance on information increases, the security of the information stored in a database, as well as the security of the data output by a database to its clients, likewise increases. Database management systems (DBMS's), which are the computer programs that are used to access the information stored in databases, often include functionality for securing data, e.g., using an encryption algorithm that relies on private keys or combinations of public and private keys.

In many databases, in particular relational databases, data is stored in the form of tables (or files), with the columns of the tables defining different fields of information, and with each row of a table representing a unique record. Likewise, data that is returned to a client in response to a query is typically organized into a table and forwarded to the client. In some databases, such as object-oriented databases, data is not stored directly in tables, but is instead stored in objects. However, result data that is returned to a client in response to a query may nonetheless be formatted in a table of rows and columns for use by the client.

Conventional encryption of database information often relies on a single encryption function applied on all of the data in a table such as a result table. Often, a private or public encryption key is used to encrypt all of the data in a result table prior to forwarding the table to a client. Once the client receives the result table, the client then applies a private decryption key to the data in the result table to decrypt the data. The data is thus protected from unauthorized access against anyone not possessing the key required to decrypt the table.

However, under such a scheme, a potential security risk exists in that if the key required to decrypt the data is ever obtained by a hacker or other unauthorized party, either through careless protection of the key by the client, or as a result of a hacker breaking the encryption algorithm, that party then has access to all of the data in the table.

Therefore, a significant need exists in the art for a more effective manner of protecting the information stored in database tables.

SUMMARY OF THE INVENTION

The invention addresses these and other problems associated with the prior art in providing an apparatus, program product and method that protect data in a database table from unauthorized access through the combination of scrambling the data in the rows and columns of a database table and encrypting the data in different rows and/or columns using different encryption keys. A complementary descrambling and decryption process may then be used by an authorized party to recover the data stored in the scrambled and encrypted table.

In particular, consistent with one aspect of the invention, data may be arranged within a plurality of column entries, and with the column entries arranged in a plurality of columns. The data may be encrypted within each column entry using an encryption key associated with the column within which such column entry is arranged. At least a subset of the column entries may then be rearranged into different columns such that each rearranged column entry is arranged in a different column than that associated with the encryption key used to encrypt the data in such rearranged column entry.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a flowchart illustrating the program flow of the process rows routine referenced in FIG. 2.

DETAILED DESCRIPTION

The embodiments discussed hereinafter protect data arranged in a table of columns and rows through a combination of scrambling and encryption. In particular, data arranged in a table is scrambled such that selected data values are rearranged into different columns and/or rows. Encryption is also applied to the data values located at different rows and columns using one of a plurality of available encryption algorithms, such that different encryption algorithms are used for different data values. Decryption may then be performed by decrypting the data values according to the encryption algorithms with which the individual data values have been encrypted, and then reorganizing the decrypted data values back into their original rows and columns. It will be appreciated that scrambling can precede encryption in some embodiments, or alternatively, encryption can precede scrambling.

In one embodiment consistent with the invention, data is arranged within a plurality of column entries, and with the column entries arranged in a plurality of columns. The data is encrypted within each column entry using an encryption key associated with the column within which such column entry is arranged. At least a subset of the column entries are then rearranged into different columns such that each rearranged column entry is arranged in a different column than that associated with the encryption key used to encrypt the data in such rearranged column entry.

The embodiments described below are suited for use in a relational database management system to protect data arranged into a table, where the data is organized into columns and rows. It will be appreciated, however, that the invention may be used in other types of databases, as well as in non-database applications where the data being protected can be logically organized into a table or table-like data structure that can define columns and rows of data.

It will also be appreciated that the data being protected may be stored within a database (i.e., the scrambling and encryption of tables actually stored in the database), or alternatively, the data being protected may take the form of result data that is being communicated to a client. Embodiments consistent with the invention may protect both stored data and communicated result data, or alternatively, may only protect stored data or communicated result data. It will also be appreciated that other security mechanisms may be used to protect data in lieu of or in conjunction with the data scrambling and encryption described herein. For example, in one embodiment, data scrambling and encryption as described herein may be used to protect result data returned to clients in response to queries, while the raw data stored in the database may be encrypted or otherwise access controlled using conventional security mechanisms. The invention is therefore not limited to the specific embodiments discussed herein.

Figure 1:
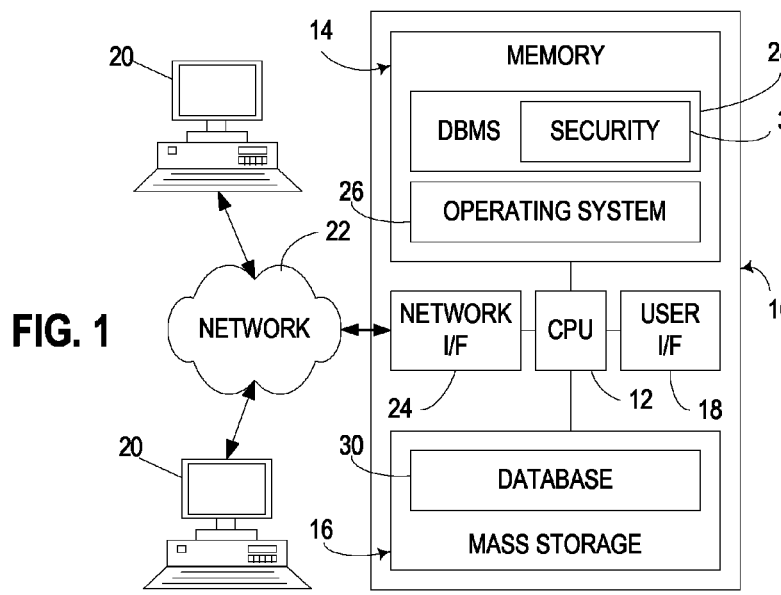
FIG. 1 is a block diagram of a networked computer system incorporating a database management system within which is implemented data scrambling and encryption consistent with the invention.

Turning now to the Drawings, wherein like numbers denote like parts throughout the several views, FIG. 1 illustrates an exemplary hardware and software environment for an apparatus 10 suitable for implementing a database management system incorporating data scrambling and encryption consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident to access a database 30, and may include a security module 32 for encrypting and/or decrypting data stored in database 30 and/or the result data being returned to a client in response to a query. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable media include but are not limited to physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

In one embodiment consistent with the invention, data in a table format may be protected by encrypting each cell, or column entry, in each distinct column by a distinct encryption key and then scrambling, or rearranging, the data into different columns upon access of the table. Any party accessing the scrambled and encrypted table would then appear to be in the original cells, but in reality would be scrambled up into different non-relational cells.

Each column in a table may have its own distinct encryption key (i.e., the encryption would be done by column), and after encryption, the data in each cell may be scrambled around in the table into columns other than that with which it was encrypted. In this embodiment, however, the data would still appear to be in the correct column, since the same encryption algorithm would be used throughout all data. Since there is a key for each column of data, even knowing one column's key would not enable all of the data to be decrypted correctly. To know where the data actually belongs, one would have to know every encryption key, the encryption algorithm used, and the de-scrambling algorithm that was used to scramble the data around.

Figure 2:
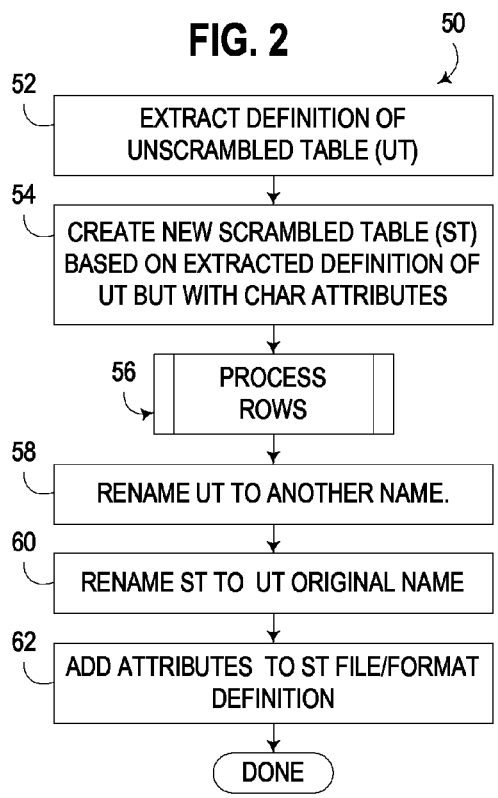
FIG. 2 is a flowchart illustrating the program flow of a build scrambled table routine executed by the database management system of FIG. 1.

FIG. 2, for example, illustrates a build scrambled table routine 50 suitable for use by database management system 28 to protect an unscrambled table, e.g., to protect a result table that has been generated in response to a client query.

Routine 50 begins in block 52 by extracting a definition for an unscrambled table (UT) provided as input to the routine. The definition may include, for example, the number of rows and columns, the attributes of each column, type, length, numerical precision, CCSID, etc. Next, block 54 creates a new scrambled table (ST) based upon the extracted definition, but with each column having a char (character) attribute. In this embodiment, the ST table has the same number of rows and columns as the UT table; however, in other embodiments, the number of rows and columns may differ (e.g., so that a 3×4 ST table is used to store the data from a 4×3 UT table).

Next, a process rows routine 56 is called to process the rows in the unscrambled table to scramble and encrypt all of the data in the table. Once the rows in the unscrambled table have been processed, block 58 renames the unscrambled table to another name, and block 60 renames the scrambled table to the original name of the unscrambled table, thus replacing the unscrambled table with the scrambled table. The attributes extracted in block 52 are then applied to the file or format definition for the scrambled table in block 62 to effectively provide a mapping for use in reconstructing the unscrambled table from the scrambled table. Routine 50 is then complete.

It will be appreciated that, for columns to be scrambled, there needs to be information associated with each row in the table. To give an example, Table I illustrates an exemplary unscrambled table (UT) with three rows and 4 columns:

TABLE I

| Unscrambled Table | | | | |
|---|---|---|---|---|
| UT | C1 | C2 | C3 | C4 |
| R1 | | | | |
| R2 | | | | |
| R3 | | | | |

For the purposes of this example, a corresponding scrambled table ST will have values from the unscrambled table labeled in form of row/column—for example, the UT value in row R2, column C3 will be designated as R2C3. Hence, one may have the following combinations shown below in Table II:

TABLE II

| Scrambled Table | | | | |
|---|---|---|---|---|
| UT | C1 | C2 | C3 | C4 |
| R1 | R1C3 | R3C1 | R2C2 | R1C2 |
| R2 | R3C4 | R2C1 | R1C1 | R3C3 |
| R3 | R2C3 | R3C2 | R2C4 | R1C4 |

As can be seen from Table II, the value in row R1, column C1 of the ST table maps to the Row 1, Column 3 of the UT table. In this example, data values are scrambled to different columns as well as to different rows. In another embodiment, however, a scrambled table ST may just have the data values in a row scrambled by column only, whereby data values to not cross over into other rows.

Associated with each row, three pieces of information are typically inserted as attributes in an internal format that is desirably hidden in a secure area of the file/format definition for the table. One such piece of information is a Row Column Scrambling (RCS) tag that comprises the parameters for the scrambling algorithm. That is, what maps from the scrambled table to the unscrambled table. In the above ST example, the RCS tag for the first row would be defined as R1C3-R3C1-R2C2-R1C2.

A second piece of information is the encryption algorithm and/or key used to encrypt the data in each column of the ST table. This information can vary greatly depending upon the type of encryption algorithm used.

The third piece of information identifies the original attributes (e.g., types and lengths) of the data in the UT table. While no such attributes may be required in some embodiments, such attributes are desirable in this embodiment so that the scrambled table can have a common character type and the data can be converted and copied between any column regardless of the column type of the source and destination columns. It will be appreciated that more or less information may be retained in a scrambled table consistent with the invention.

FIG. 3 illustrates one implementation of the process rows routine 56 referenced in FIG. 2, which utilizes the three types of information discussed above to describe a scrambled table. Routine 56 begins in block 70 by initiating a loop to process each row in the UT table. For each such row, block 72 gets the row and generates a column scrambling list for that row. The column scrambling list is used to determine where each column in a row will be moved. The list may be generated randomly or determinalistically, e.g., to ensure that different columns in different rows do not map to the same columns.

Next, block 74 initiates a second loop to process each column in the row. For each such column, block 76 encrypts the data value in the column and moves the encrypted value into a buffer at a position corresponding to where the encrypted value is to be inserted into a row according to the column scrambling list. Block 78 then generates or updates the row column scrambling tag, encryption information, and attributes for the current row to reflect the position, encryption information and attributes of the current column for the current row. Control then returns to block 74 to process the remaining columns in the row.

Once all columns have been processed, block 74 returns control to block 70 to process additional rows in the UT table.

Once all such rows have been processed, block 70 passes control to block 80 to initiate a process to scramble columns between rows. It will be appreciated that if scrambling is only performed between columns in the same row, the process performed by blocks 80 and 82 would not be required.

Block 80 begins at the beginning of the ST table and processes each row in the table by calculating the row scrambling tag for each row so that columns can be moved across row boundaries. Block 82 then moves selected columns from selected rows across rows in the ST table and updates the row column scrambling tags, encryption information and column attributes for the source and destination rows. Routine 56 is then complete, and control returns to block 58 of FIG. 2.

The aforementioned routines are used to convert an existing unscrambled table to a scrambled table. However, it will be appreciated that the concepts embodied in the aforementioned routines can also be used to perform other operations such as inserting, updating, and deleting rows into/from a scrambled table.

Figure 4:
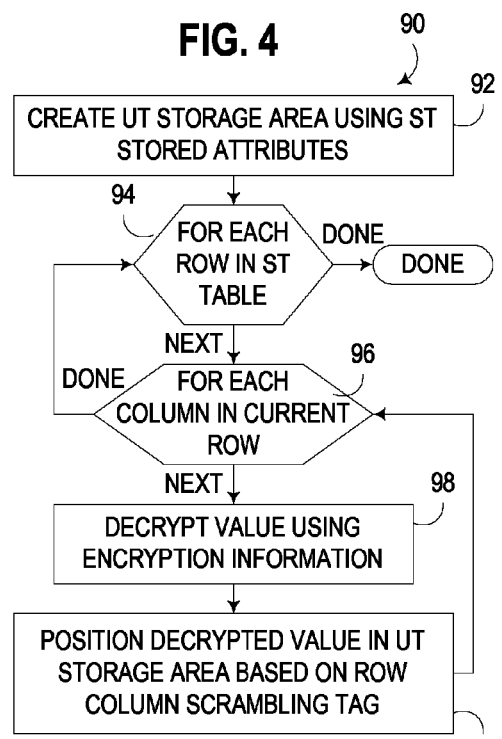
FIG. 4 is a flowchart illustrating the program flow of an unscramble table routine executed by the database management system of FIG. 1.

To retrieve values from a scrambled table, whether a table stored in a database or a result set table, a routine such as routine 90 of FIG. 4 may be used. Routine 90 begins in block 92 by creating a UT storage area using the stored attributes in the ST table. The UT storage area can be implemented using a table, or a storage area on DASD or any medium in a computer to contain information. Once this is done, information can be decrypted from the ST table and inserted into the UT storage area in the correct position.

In particular, blocks 94 and 96 initiate two nested loops to process each column in each row of the ST table. For each such column/row, block 98 decrypts the value in that column/row using the encryption information stored for the row. Block 100 then positions the decrypted value in the appropriate row/column in the UT storage area based upon the row column scrambling tag for the row. Control then returns to block 96 until all columns in a row are processed, and then to block 94 until all rows are processed. Once all positions in the ST table have been processed, routine 90 is complete.

It will be appreciated that instead of unscrambling an entire table, selected entries in an ST table could be decrypted and accessed in a similar manner to that described in connection with FIG. 4.

One advantage of the process described herein is that if a hacker were to break into a system and access a scrambled table, the hacker might be able to determine the table was encrypted, and the hacker might attempt to use a brute force method to find a key to decrypt everything in the table. Little known to the hacker, however, multiple encryption keys would have been used, and furthermore, even if the hacker were to find one column's encryption key and decrypt that column, the decryption would still not yield the correct results since the data being showed in the encrypted column's view was encrypted with different encryption keys. The hacker would get back a different table view which would still be encrypted.

Additional features and modifications may be made to the illustrated embodiments consistent with the invention. For example, additional security may be provided by using a MAC (Media Access Control) address to distinguish between a hacker who does not have authority to the table and a user who does.

Other modifications will be apparent to one of ordinary skill in the art. Therefore, the invention lies in the claims hereinafter appended.

What is claimed is:

1. A method for protecting data, the data arranged within a plurality of column entries, and the column entries arranged in a plurality of columns, the method comprising:
   with at least one hardware-implemented processor, encrypting the data within each column entry using an encryption key associated with the column within which such column entry is arranged;
   with the at least one hardware-implemented processor, rearranging at least a subset of the column entries into different columns such that each rearranged column entry is arranged in a different column than that associated with the encryption key used to encrypt the data in such rearranged column entry; and
   after encrypting the data and rearranging at least a subset of the column entries into different columns, rearranging at least a subset of the column entries into different columns such that each rearranged column entry is arranged in the column that is associated with the encryption key used to encrypt the data in such rearranged column entry, and decrypting the data within each column entry.

2. The method of claim 1, wherein the column entries and columns are disposed within a database table, the method further comprising restricting access to the table by a user based upon a Media Access Control (MAC) address associated with the user.

3. The method of claim 1, wherein the column entries and columns are disposed within a database table, and wherein rearranging at least the subset of column entries into different columns includes changing the number of columns in the table.

4. The method of claim 1, wherein the column entries and columns are disposed within a database table, and wherein each column in the table is associated with a different encryption key from every other column in the table.

5. The method of claim 1, wherein the plurality of column entries are further arranged into a plurality of rows, the method further comprising rearranging at least a subset of the column entries into different rows.

6. An apparatus, comprising:
   data resident in a computer readable medium and arranged within a plurality of column entries, with the column entries arranged in a plurality of columns;
   at least one processor; and
   program code configured to be executed by the at least one processor to protect the data by encrypting the data within each column entry using an encryption key associated with the column within which such column entry is arranged, and rearranging at least a subset of the column entries into different columns such that each rearranged column entry is arranged in a different column than that associated with the encryption key used to encrypt the data in such rearranged column entry, wherein the column entries and columns are disposed within a database table, and wherein each column in the table is associated with a different encryption key from every other column in the table.

7. An article of manufacture, comprising:
   a non-transitory computer readable medium; and
   program code stored on the computer readable medium and configured upon execution to protect data arranged within a plurality of column entries, with the column entries arranged in a plurality of columns, by encrypting the data within each column entry using an encryption key associated with the column within which such column entry is arranged, and rearranging at least a subset of the column entries into different columns such that each rearranged column entry is arranged in a different column than that associated with the encryption key used to encrypt the data in such rearranged column entry, wherein the plurality of column entries are further arranged into a plurality of rows, the program code further configured to rearrange at least a subset of the column entries into different rows.

* * * * *